United States Patent [19]  [11] 4,025,958
Orima et al.  [45] May 24, 1977

[54] JITTER PREVENTION SYSTEM FOR VIDEO SIGNAL PROCESSING

[75] Inventors: Isamu Orima; Hitoshi Sone; Kiyoshi Sone, all of Tokyo, Japan

[73] Assignee: Ricoh Co., Ltd., Tokyo, Japan

[22] Filed: May 29, 1975

[21] Appl. No.: 582,029

[30] Foreign Application Priority Data

June 1, 1974 Japan ............................. 49-62069

[52] U.S. Cl. .................................. 360/73; 360/75; 360/9; 358/133; 358/267
[51] Int. Cl.² .................. G11B 15/46; G11B 21/02
[58] Field of Search ............. 360/14, 15, 9, 10, 70, 360/73, 75; 318/318, 314; 178/6.6 R, 6.6 A, 6.6 DD, 6.6 P, DIG. 3

[56] References Cited

UNITED STATES PATENTS

| 2,828,459 | 3/1958 | Pear | 318/318 |
|---|---|---|---|
| 3,175,035 | 3/1965 | MacDonald | 360/9 |
| 3,176,067 | 3/1965 | Machein | 360/14 |
| 3,230,307 | 1/1966 | Bounsall | 360/14 |
| 3,493,677 | 2/1970 | Paine | 360/9 |
| 3,535,467 | 10/1970 | Thieme | 360/15 |
| 3,662,098 | 5/1972 | Yano | 360/70 |
| 3,701,846 | 10/1972 | Zenzefilis | 178/6.6 DD |
| 3,787,616 | 1/1974 | Falk | 178/6.6 A |
| 3,873,764 | 3/1975 | Boltz | 178/6.6 DD |
| 3,881,188 | 4/1975 | Zenzefilis | 178/DIG. 3 |

Primary Examiner—Bernard Konick
Assistant Examiner—Alan Faber
Attorney, Agent, or Firm—Frank J. Jordan

[57] ABSTRACT

Video signals are transferred from a phonograph record or low speed magnetic tape and stored on a magnetic sheet disc rotating at low speed. The magnetic sheet disc is then rotated at high speed to output the video signals to a television display or the like. In the invention, clock signals representing equal intervals of time are provided with the video signals on the phonograph record or low speed magnetic tape. The signals are picked up when the record or tape is rotated and the frequency thereof is analogous to the instantaneous rotational speed of the record or tape drive motor. The video is stored on the magnetic sheet disc by a write head. The magnetic sheet disc is provided with reference marks which are sensed when the magnetic sheet disc is rotated and the frequency thereof is analogous to the instantaneous rotational speed of the disc relative to the write head. The two frequencies are compared. The speed of the disc relative to the write head is controlled by varying the speed of the disc and/or rotating the write head relative to the disc so that the ratio of the instantaneous speed of the record or low speed tape to the design speed thereof is equal to the ratio of the instantaneous speed of the disc relative to the write head to the design speed of the disc. The video signals are thereby stored on the disc in the correct positions to eliminate jitter on the television display.

10 Claims, 5 Drawing Figures

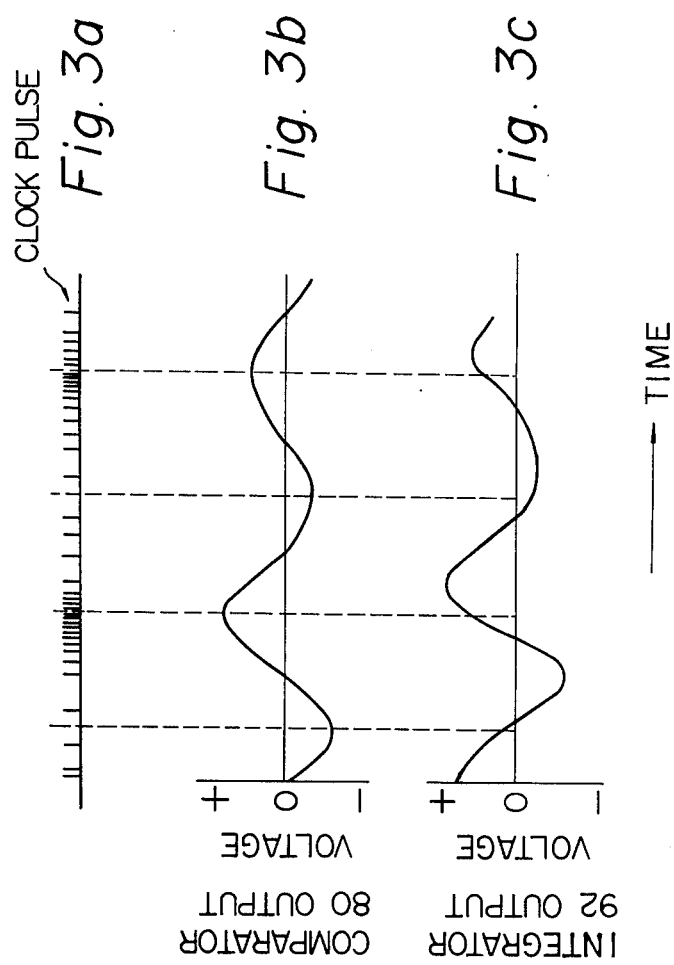

JITTER PREVENTION SYSTEM FOR VIDEO SIGNAL PROCESSING

The present invention relates to a jitter prevention system for a video signal processing device.

It is known in the prior art to store video data from a television camera or the like on a phonograph record or low speed magnetic tape. The record or tape is then played on a suitable reproduction device and the video signals are transferred therefrom onto a magnetic disc. The disc is then rotated at a high speed and the video signals are output to a television display or the like.

In a typical magnetic disc for television display, an entire scan frame is stored on one circumferential track of the disc so that each scan line occupies an angular portion on the track equal to 360°/N, where N is the number of scan lines per frame. Since the frame time of a television display is typically 1/30 sec., the disc is rotated at a speed of 1800 rpm to output the video signals to the television display. In practice, the disc is rotated at a speed several hundred times less than 1800 rpm when the video signals are being transferred thereto from the record or tape.

In consumer applications it is preferable to provide a low cost drive motor for the record or tape. However, a problem inherent in this expedient is that the speed of such a low cost motor is not precisely constant. As a result, the video signals are not stored at their proper positions on the disc. This error is multiplied by several hundred times when the disc is rotated at 1800 rpm so that the display on the television appears to jitter. This is a major drawback concerning the commercial value of the system.

It is therefore an object of the present invention to provide a method of eliminating jitter from a video processing device of the type described above.

It is another object of the invention to provide a system embodying the above method.

It is another object of the present invention to provide a video processing system in which video data on a record or tape is reproduced by a player driven by a low speed motor and transferred onto a magnetic disc whereby the rotational speed of the disc relative to a write head operatively provided thereto is varied in the same manner as the rotational speed of the low cost drive motor so that the video data will be stored on the disc in the correct locations and jitter will thereby not occur in the image on a television display.

The above and other objects, features and advantages of the invention will become clear from the following detailed description taken with the accompanying drawings, in which:

FIG. 3a is a timing diagram of clock pulses produced in the device shown in FIG. 2;

FIG. 3b is a timing diagram of a control signal produced in the device shown in FIG. 2; and FIG. 3c is a timing diagram of another control signal produced in the device shown in FIG. 2.

Figure 1:
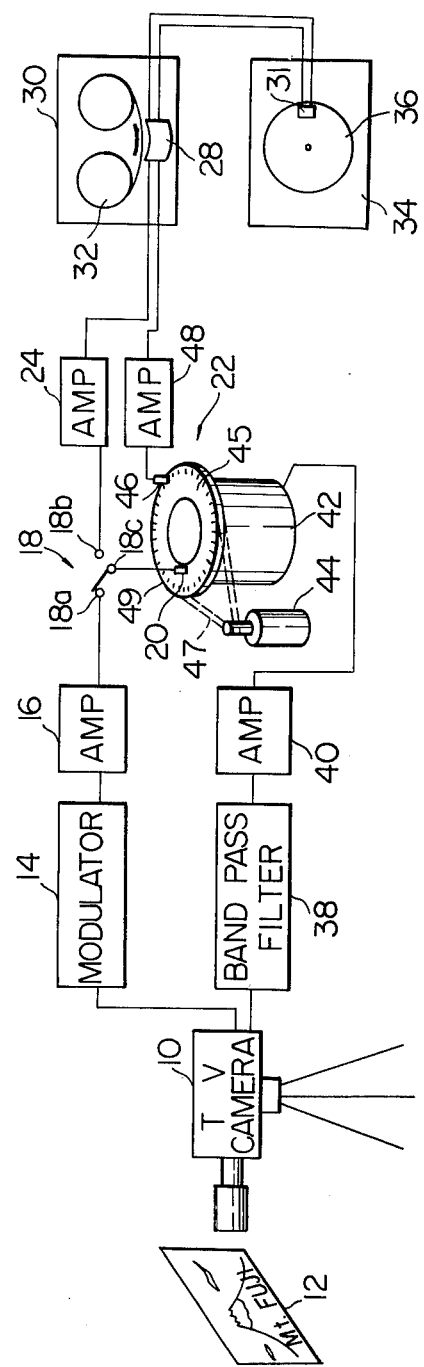
FIG. 1 is schematic diagram of a device for storing video signals on a phonograph record.

Referring now to FIG. 1, a device is shown which is adapted to store electrical video signals on a phonograph record for subsequent reproduction. The video signals represent a series of stationary images which are designed to follow each other at intervals of, for example 30 seconds. The effect is similar to that of a slide show, and a sound track may be provided if desired. The device is highly practical as a teaching aid or the like.

A television camera 10 is arranged to produce electrical video signals representing a picture 12 which may be used in a geography lesson travel promotion or the like. The signals are fed from the camera 10 through a modulator 14 and a recording amplifier 16 to a fixed contact 18a of a switch 18. A movable contact 18c of the switch 18 is shown as engaging with the fixed contact 18a and being connected to a read-write head 20 of a magnetic sheet disc unit 22. The movable contact 18c of the switch 18 is movable to engage with a fixed contact 18d of the switch 18 which is connected to an amplifier 24. The output of the amplifier 24 is connected to an input of a read-write head 28 of a tape unit 30. A tape 32 is operatively received in the tape unit 30. The read-write head 28 is also connected to a stylus 31 of a record cutting unit 34 which receives a record 36.

The vertical synchronizing signal from the camera 10 is shaped into a sinusoidal wave by a band pass filter 38, amplified by an amplifier 40 and applied as a driving signal to a high speed synchronous motor 42 adapted to rotatably drive a magnetic sheet disc 45 of the disc unit 22 at, for example, 1800 rpm. A low speed drive motor 44 is connected through a belt 47 to rotatably drive the disc 45 at a low speed several hundred times lower than 1800 rpm. Clock marks 49 are equiangularly spaced on the circumference of the disc 45 and are sensed by a sensor 46 operatively disposed relative thereto. The output of the sensor 46 is applied to an amplifier 48, the output of which is connected to another input of the read-write head 28 of the tape unit 30.

In operation, the television camera 10 scans the picture 12 and produces electrical video signals representing the same. These signals are modulated by the modulator 14 and amplified by the amplifier 16 and applied to the write portion of the read-write head 20. The motor 42 is driven by the shaped vertical synchronizing signals from the television camera 10 to rotate the disc 45 at precisely 1800 rpm so that the video signals are accurately stored on the disc 45. The motor 42 is then de-energized and the switch 18 thrown so that the contact 18c engages with the contact 18b. The low speed motor 44 is then energized to rotate the disc 45 at a speed several hundred times lower than 1800 rpm.

The video signals are picked up by the read portion of the read-write head 20 and fed through the switch 18 and amplifier 24 to the write portion of the read-write head 28 to be stored on the tape 32. The motor 44 is preferably an expensive component whereby the speed thereof is precisely constant so that the frequency of occurence of clock signals resulting from the clock marks 49 being sensed by the sensor 46 represent equally spaced intervals of time. These clock signals are stored on the tape 32 along with the video signals. The tape 32 serves as a master tape, and is subsequently driven at low speed so that video signals picked up by the read portion of the read-write head 28 are fed to the stylus 31 to produce the record 36. A large number of records 36 may be made from one master tape as is well known in the art. If desired, a plurality of low speed tapes in, for example, cassette form may be made instead of the records 36 or the tape 32 may be used directly.

In the process of producing the record 36, the video signals representing one picture 12 are stored on the disc 45 and recorded on the record 36. The disc 45 has the storage are thereof arranged in an endless manner. Subsequently, another picture is scanned by the camera 10 and the video signals representing the second picture are stored on the disc 45 and therefrom on the record 36. The record 36 thereby contains the video signals a plurality of pictures arranged in sequence. Means for storing associated audio signals are conventional and are not shown.

Figure 2:
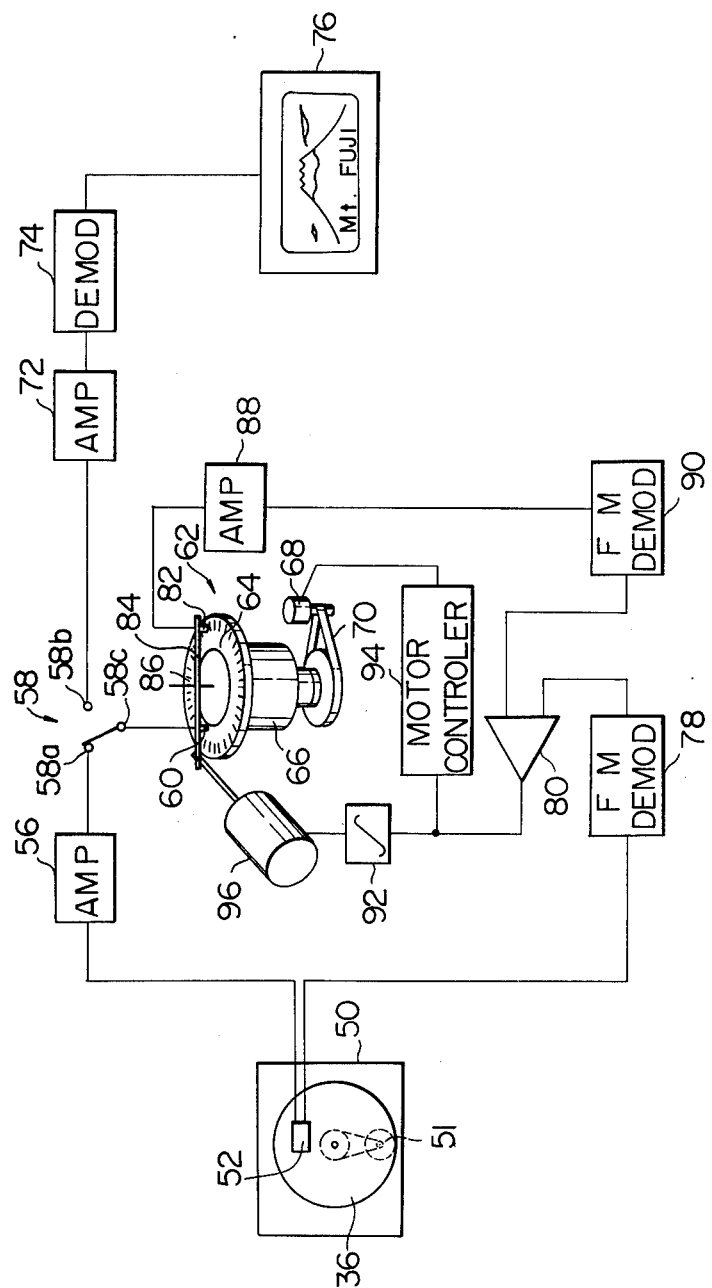
FIG. 2 is a schematic diagram of a device for reproducing the video signals stored on the phonograph record and reproducing the signals as a picture on a television display, the device comprising a system embodying the present invention for preventing jitter in the television display.

FIG. 2 shows a device for reproducing the pictures represented by the video signals stored on the record 36. A player 50 for the record 36 is provided with a low cost motor 51 to rotatably drive the record 36 so that a pickup 52 can pick up the video signals and feed the same through an amplifier 56 and switch 58 to a read-write head 60 of a magnetic sheet disc unit 62. The magnetic sheet disc unit 62 is provided with a magnetic sheet disc 64 operatively arranged relative to the head 60. A synchronous high speed motor 66 is provided to rotatably drive the disc 64 at a precisely constant speed of 1800 rpm. A low speed motor 68 is adapted to normally drive the disc 64 through a belt 70 at a low speed which is several hundred times less than 1800 rpm.

The switch 58 is shown as comprising fixed contacts 58a and 58b with which a movable contact 58c is selectively engagable. The contact 58a is connected to the output of the amplifier 56. The contact 58c is connected to the read-write head 60. The contact 58b is connected through an amplifier 72 and a demodulator 74 to a television display unit 76.

The clock pulses are fed through an FM demodulator 78 to an input of a comparator 80. A sensor or pickup 82 is arranged to sense reference marks 86 permanently provided on the disc 64. Both the read-write head 60 and the sensor 82 are mounted on an arm 84 which is rotatable about the axis of the disc 64. The output of the sensor 82 is fed through an amplifier 88 and an FM demodulator 90 to another input of the comparator 80. The output of the comparator 80 is applied to an input of a motor controller 94 adapted to control the speed of the motor 68 and to an input of an integrator 92. The output of the integrator 92 is applied to an actuator 96 adapted to rotatably move the arm 84. The reference marks 86 may be magnetic, optical or in any other form with the sensor 82 being suitable designed to produce signals in response thereto. The reference marks 86 are equiangularly spaced about the circumference of the disc 64, and the frequency of occurence of the signals produced in response to the sensing thereof is analogous to the instantaneous speed of the disc 64 relative to the sensor 82 and read-write head 60.

In operation, the record 36 is rotated at low speed by the motor 51 and the video signals from the pickup 52 are fed to the amplifier. In this condition the switch 58 is thrown so that the contact 58c engages with the contact 58a. The video signals are thereby fed from the amplifier 56 through the switch 58 to the write portion of the read-write head 60. The motor 68 is energized so that the disc 64 is rotated at low speed. The video signals representing the one picture 12 are thereby stored on the disc 64.

The switch 58 is subsequently thrown so that the contact 58c engages with the contact 58b. The motor 68 is de-energized and the high speed motor 66 is energized so that the disc 64 is rotated at 1800 rpm and the video signals picked up by the read portion of the read-write head 60 are fed through the switch 58, amplifier 72 and demodulator 74 to the television display 76 so as to form an image of the picture 12 thereon. The memory area of the disc 64 is endless so that the video signals may be fed to the television display 76 any number of times to produce the image of the picture 12 for as long as desired. This process is repeated to display the video signals representing the subsequent pictures stored on the record 36.

As mentioned above, the motor 51 is preferably cheap to make the reproducing unit commercially attractive, and the speed thereof is not precisely constant. This results in the various scan lines of the video image being stored on the disc 64 in an irregular manner which is magnified by the ratio of 1800 rpm to the low rotational speed of the disc 64 when the disc 64 is rotated at 1800 rpm to display the video signals on the television display 76. The result is an image on the television display 76 which appears to jitter since sequential scan lines do not have the same length. This effect is illustrated in FIG. 3a. Although the clock pulses provided with the video signals representing equal intervals in time should be equally spaced in the timing diagram of FIG. 3a, they are closer together when the motor 51 is rotating too fast and further apart when the motor 51 is rotating too slow.

The present invention is designed to overcome this problem and prevent jitter on the television display 76. The clock pulses from the pickup 52 are FM demodulated to provide a DC signal which is applied to the comparator 80, the voltage of which represents the instantaneous or actual speed of rotation of the motor 51 and thereby the phonograph record 36. The reference marks 86 are sensed by the sensor 82 to produce reference pulses which are fed through the amplifier 88 to the FM demodulator 90. The demodulator 90 produces a DC signal which is fed to the comparator 80, the voltage of which represents the actual speed of the disc 64 relative to the read-write head 60 and the sensor 82 since both the head 60 and sensor 82 are mounted on the same arm 84. Assuming that the design or normal speeds of the motors 51 and 68 are such that the frequencies of occurence of the clock pulses and the reference pulses are equal when the device is operating correctly, the comparator 80 will produce a zero output. The motor controller 94 will control the motor 68 to continue to rotate at the correct speed and the actuator 96 will be de-energized so that the arm 84 will remain stationary.

When however, the motor 51 is rotating too fast, the frequency of occurence of the clock pulses is increased above the normal value so that the output voltage of the FM demodulator 78 increases. Assuming that the motor 68 is rotating at the correct speed, the output voltage of the demodulator 78 will be higher than that of the demodulator 90 and the integrator 92 will produce a positive output voltage. It is to be noticed that the integrator 92 is provided so as to make the output of the comparator 80 analogous to the rotational speed of the read-write head 60 which is rotated by the arm 84 which is rotatably moved by the actuator 96.

If the condition just described were allowed to continue, the video data would be bunched up on the disc 64 and would be the cause of jitter on the television display. However, the output of the comparator 80 causes the motor controller 94 to increase the speed of the motor 68 so that the video data will be spread out on the disc 64. Simultaneously the actuator 96 is energized by the integrator 92 so as to rotate the read-write head 60 in a direction opposite to the direction of rotation of the disc 64 to further increase the relative speed between the disc 64 and the head 60. This increases the frequency of occurence of the signals produced by sensing the reference marks 86 so that the demodulator 90 produces a higher output voltage. The system stabilizes when the output voltages of the demodulators 78 and 80 are equal so that the video signals are evenly spaced at their correct locations on the disc 64.

As shown in FIG. 3b, the opposite effect occurs when the motor 51 is rotating too slowly. The clock pulses are spread out as shown and the comparator 80 produces a negative output to slow down the motor 68 and rotate the head 60 in the same direction as the disc 64. The output of the integrator 92 is shown in FIG. 3c.

The speeds of rotation of the record 36 and disc 64 when rotated at low speed are related to each other under equilibrium conditions of the system so that the ratio of the actual speed of the record 36 to the design or normal speed thereof is equal to the ratio of the speed of the disc 64 relative to the head 60 to the normal or design speed of the disc 64. When both of the motors 51 and 68 are operating at their design speeds, both of said ratios are equal to unity.

In practice, the motor 51 and the motor 68 may be of the synchronous type whereby the average speed is equal to the design speed and the actual speed deviates therefrom in a generally sinusoidal manner as shown in FIG. 3b. The arm 84 will thereby rotatably oscillate.

If the speed variations of the motor 51 are small and the response of the motor 68 to speed change signals is fast, the arm 84 may be fixed and the effects of the invention be produced by varying the speed of the motor 68 alone. In most cases, however, the inertia of the motor 68 and disc 64 is high so that the motor 68 can not respond sufficiently quickly. The arm 84 has low inertia and can respond much faster. It is also possible to have the motor 68 rotate at constant speed and produce the effects of the invention by moving the arm 84 alone.

It will be realized that the jitter prevention system restores the timing intervals of the video signals as originally stored on the disc 45, and will correct for variations introduced in any intervening step of the data processing sequence including the various recording operations of the tape 32 and record 36 as well as for variations in the speed of the motor 51. The invention may be applied to any device or process involving the compression or expansion of electrical data in which the data is stored on a temporary storage element moving at one speed and read out with the storage element moving at another speed. It is also possible, if the motor 68 is adapted to rotate at a constant speed in a precise manner, to omit the timing marks 86, amplifier 88 and demodulator 90 and apply a fixed reference voltage to the comparator 80. In this case, the arm 84 is rotated in response to variations in the frequency of occurence of the clock pulses representing the variations in speed of the motor 51 to vary the speed of the disc 64 relative to the head 60.

The disc 64 moreover may be replaced by any temporary storage unit in which a movable storage element is moved for writing and reading out data. Many other modifications within the scope of the present invention will become possible for those skilled in the art after receiving the teachings of the present disclosure.

What is claimed is:

1. In a method of transferring electrical data from a first moving storage element of a first storage means to a second moving storage element of a second storage means, the second storage means having a write member to write the electrical data on the second storage element, the second moving storage element having equally spaced reference marks, the first storge element being designed to move at a first predetermined speed but the actual speed of the first storage element deviating slightly from the first predetermined speed, the second moving storage element being designed to move at a second predetermined speed, the electrical data including signals representing equally spaced intervals of time, the steps of:
  a. sensing the frequency of occurrence of the signals which denote the actual speed of the first storage element;
  b. sensing the frequency of occurrence of the reference marks which denote the speed of the second storage element relative to the write member;
  c. comparing the frequency of occurence of the signals to the frequency of occurrence of the reference marks; and
  d. controlling the actual speed of the second storage element and controlling movement of the write member relative to the second storage element to thereby provide for relative speed control between the second storage element and the write member so that the ratio of the actual speed of the first storage element to the first predetermined speed is equal to the ratio of the speed of the second storage element relative to the write member to the second predetermined speed.

2. The method of claim 1, in which step (a) comprises frequency demodulating the frequency of occurence of the signals to obtain a direct current signal having a voltage analogous to the actual speed of the first storage element.

3. The method of claim 1, in which step (b) comprises frequency demodulating the frequency of occurence of the reference marks to obtain a direct current signal having a voltage analogous to the speed of the second storage element relative to the write member.

4. The method of claim 3, in which step (a) comprises frequency demodulating the frequency of occurence of the signals to obtain a direct current signal analogous to the actual speed of the first storage element, and in which step (d) comprises comparing the voltages of the direct current signals.

5. In an electrical data processing system including a first storage means having a first moving storage element, a second storage means having a second moving storage element and a write member operatively provided to the second storage element, means connecting the first storage means to the write member for transfer of electrical data from the first storage element to the second storage element, the second storage element having equally spaced reference marks, the first storage means having first drive means being designed to move the first storage element at a first predetermined speed but the actual speed of the first storage element deviating slightly from the first predetermined speed, the second storage means having second drive means designed to move the second storage element at a second predetermined speed, the electrical data including signals representing equally spaced intervals in time, the combination therewith of:

first sensing means for sensing the frequency of occurrence of the signals which denote the actual speed of the first storage element;

second sensing means for sensing the frequency of occurrence of the reference marks which denote the speed of the second storage element relative to the write member;

third drive means for moving the write member relative to the second storage element; and control means operable to control the second drive means to vary the speed of the second storage element and also operable to control the third drive means to move the write member;

the control means comprising a comparator to compare the frequency of occurrence of the signals to the frequency of occurrence of the reference marks and being operative to control the second drive means and the write member to change the speed of the second storage element relative to the write member until the ratio of the actual speed of the first storage element to the first predetermined speed is equal to the ratio of the speed of the second storage element relative to the write member to the second predetermined speed.

6. The data processing system of claim 5, in which the control means comprises a first frequency demodulator to produce a direct current signal having a voltage analogous to the frequency of occurence of the signals and a second frequency demodulator to produce a direct current signal having a voltage analogous to the frequency of occurence of the reference marks, the comparator being operative to compare the voltages of the direct current signals.

7. The data processing system of claim 5, in which the second storage element is a rotary disc.

8. The data processing system of claim 7, in which the rotary disc is a magnetic disc and the write member is a magnetic head.

9. The data processing system of claim 5, in which the second storage element is a rotary disc and the write member is rotatably movable about the axis of the rotary disc, the third drive means being operative to rotatably move the write member.

10. The data processing system of claim 9, in which the rotary disc is provided with equally spaced reference marks, the second sensing means sensing the frequency of occurence of the reference marks which is analogous to the speed of the rotary disc relative to the write member, the second sensing means being mounted for unitary rotation with the write member about the axis of the rotary disc;

the comparator comparing the frequency of occurence of the signals with the frequency of occurence of the reference marks and being operative to control the second and third drive means to change the speed of the second storage element relative to the write member until the ratio of the actual speed of the first storage element to the first predetermined speed is equal to the ratio of the speed of the rotary disc relative to the write member to the second predetermined speed.

\* \* \* \* \*